(12) United States Patent
Belgaied et al.

(10) Patent No.: US 7,848,331 B2
(45) Date of Patent: Dec. 7, 2010

(54) MULTI-LEVEL PACKET CLASSIFICATION

(75) Inventors: Kais Belgaied, Sunnyvale, CA (US); Nicolas G. Droux, Rio Rancho, NM (US); Sunay Tripathi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1012 days.

(21) Appl. No.: 11/490,745

(22) Filed: Jul. 20, 2006

(65) Prior Publication Data

US 2008/0019360 A1 Jan. 24, 2008

(51) Int. Cl.
*H04L 12/56* (2006.01)
*G06F 12/00* (2006.01)

(52) U.S. Cl. .......... 370/395.32; 370/392; 711/117; 711/E12.017

(58) Field of Classification Search .......... 370/351, 370/392, 395.31, 395.32; 711/117, E12.016, 711/E12.017
See application file for complete search history.

(56) References Cited

U.S. PATENT DOCUMENTS

| | | | |
|---|---|---|---|
| 6,041,053 A | 3/2000 | Douceur et al. | |
| 6,070,219 A * | 5/2000 | McAlpine et al. | 710/263 |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,149,216 B1 * | 12/2006 | Cheriton | 370/392 |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,356,033 B2 * | 4/2008 | Basu et al. | 370/392 |
| 2003/0037154 A1 | 2/2003 | Poggio et al. | |
| 2004/0267866 A1 | 12/2004 | Carollo et al. | |
| 2005/0111455 A1 | 5/2005 | Nozue et al. | |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Dang T Ton
*Assistant Examiner*—Ryan C Kavleski
(74) *Attorney, Agent, or Firm*—Osha • Liang LLP (57) ABSTRACT

A method for processing a packet that includes receiving the packet where the packet comprises a header, and traversing a flow table comprising a plurality of flow table entries (FTEs) for each FTE encountered during the traversal, obtaining a packet matching function associated with the FTE, applying the packet matching function associated with the FTE to the header to determine whether the packet matches the FTE, if the packet matches the FTE, send the packet to one selected from the group consisting of one of a plurality of receive rings (RRs) and a first sub-flow table, where the first sub-flow table is associated with the FTE, stopping the traversal of the flow table, and if the packet does not match the FTE continue the traversal of the flow table.

6 Claims, 8 Drawing Sheets

U.S. PATENT DOCUMENTS

| | | |
|---|---|---|
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1* | 3/2006 | Grobman ........................ 718/1 |
| 2006/0173970 A1* | 8/2006 | Pope et al. .................. 709/216 |
| 2006/0174324 A1 | 8/2006 | Zur et al. |
| 2007/0112794 A1* | 5/2007 | McRae ....................... 707/100 |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

MULTI-LEVEL PACKET CLASSIFICATION

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. Pat. No. 7,471,689; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. Pat. No. 7,593,404; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. Pat. No. 7,499,457; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11,489,934; "Notifying Network Applications of Receive Overflow Conditions" with U.S. application Ser. No. 11/490,479; "Host Operating System Bypass for Packets Destined for a Virtual Machine" with U.S. application Ser. No. 11/489,943; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing a packet. The method comprises receiving the packet wherein the packet comprises a header, and traversing a flow table comprising a plurality of flow table entries (FTEs), for each FTE encountered during the traversal, obtaining a packet matching function associated with the FTE, applying the packet matching function associated with the FTE to the header to determine whether the packet matches the FTE, if the packet matches the FTE, sending the packet to one selected from the group consisting of one of a plurality of receive rings (RRs) and a first sub-flow table, wherein the first sub-flow table is associated with the FTE, stopping the traversal of the flow table, and if the packet does not match the FTE, continuing the traversal of the flow table.

In general, in one aspect, the invention relates to a network interface card. The network interface card comprises a plurality of receive rings (RRs), a flow table comprising a plurality of flow table entries (FTEs), a first sub-flow table comprising a first plurality of sub-flow table entries (SFTEs), wherein the NIC is configured to receive the packet wherein the packet comprises a header, and traverse the flow table, for each FTE encountered during the traversal, obtain a packet matching function associated with the FTE, apply the packet matching function associated with the FTE to the header to determine whether the packet matches the FTE, if the packet matches the FTE, send the packet to one selected from the group consisting of one of the plurality of receive rings (RRs) associated with the FTE and the first sub-flow table, wherein the first sub-flow table is associated with the FTE, and stop the traversal of the flow table, and if the packet does not match the FTE, continue the traversal of the flow table.

In general, in one aspect, the invention relates to a system. The system comprises a network interface card (NIC) configured to receive a packet, wherein the packet comprises a header, a host, operatively connected to the NIC comprising a plurality of software receive rings (SRRs), a plurality of virtual network interface cards (VNICs), wherein each of the plurality of SRRs is associated with at least one of the plurality of VNICs, and a software classifier comprising a flow table comprising a plurality of flow table entries (FTEs), a first sub-flow table comprising a plurality of sub-flow table entries (SFTEs), wherein the software classifier is configured to: receive the packet from the NIC, and traverse the flow table, for each FTE encountered during the traversal, obtain a packet matching function associated with the FTE, apply the packet matching function associated with the FTE to the header to determine whether the packet matches the FTE, if the packet matches the FTE, send the packet to one selected from the group consisting of one of the plurality of SRRs and the first sub-flow table, wherein the first sub-flow table is associated with the FTE, stopping the traversal of the flow table, and if the packet does not match the FTE, continuing the traversal of the flow table.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for processing packets. More specifically, embodiments of the invention relate to a method and system for classifying packets using multi-level classification. In one embodiment of the invention, the result of the classification is the routing of packets to the appropriate hardware receive ring (HRR) and/or software receive ring (SRR).

Figure 1:
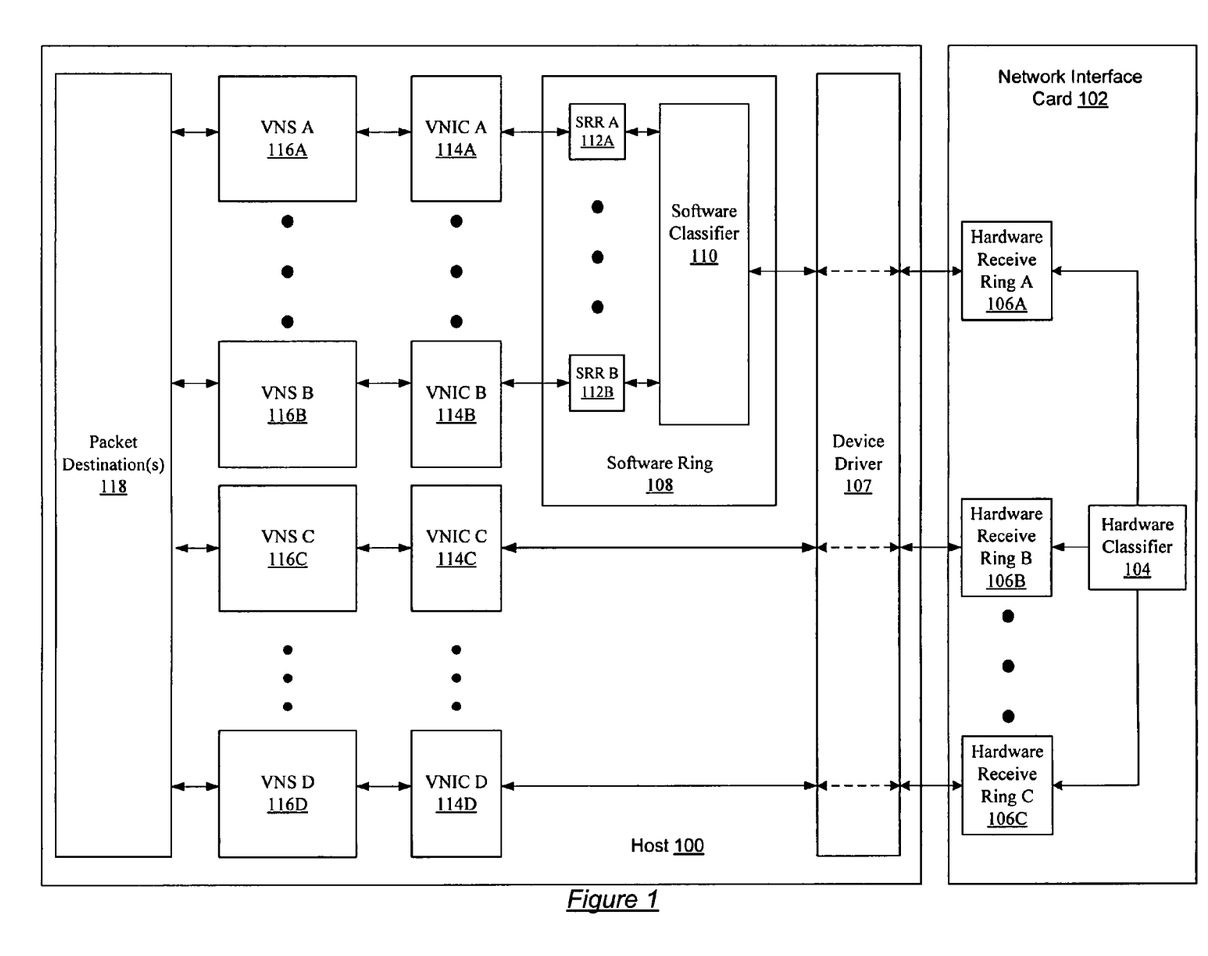
FIG. 1 shows system in accordance with one embodiment of the invention.

FIG. 1 shows a system in accordance with one embodiment of the invention. As shown in FIG. 1, the system includes a host (100) operatively connected to a network interface card (NIC) (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network) (not shown). For example, the NI may correspond to an RJ-45 connector, a wireless antenna, etc. The packets received by the NI are then sent to other components on the NIC (102) for processing. In one embodiment of the invention, the NIC (102) includes a hardware classifier (104) and one or more hardware receive rings (HRRs) (106A, 106B, 106C). In one embodiment of the invention, the HRRs (106A, 106B, 106C) correspond to portions of memory within the NIC (102) used to temporarily store the received packets.

In one embodiment of the invention, the hardware classifier (104) is configured to analyze the incoming network traffic, typically in the form of packets, received from the network (not shown). Further, in one embodiment of the invention, the hardware classifier (104) implements multi-level classification as described below in FIGS. 2-3 and 7. The hardware classifier (104) may be implemented entirely in hardware (i.e., the hardware classifier (104) may be a separate microprocessor embedded on the NIC (102)). Alternatively, the hardware classifier (104) may be implemented in software stored in memory (e.g., firmware, etc.) on the NIC (102) and executed by a microprocessor on the NIC (102).

In one embodiment of the invention, the host (100) may include the following components: a device driver (107), a software ring (108), one or more virtual network interface cards (VNICs) (114A, 114B, 114C, 114D), one or more virtual network stacks (VNSs) (116A, 116B, 116C, 116D), and one or more packet destinations (118) (e.g., containers and/or services). Each of the aforementioned components is described below.

In one embodiment of the invention, the device driver (107) provides an interface between the HRRs (106A, 106B, 106C) and the host (100). More specifically, the device driver (107) exposes the HRRs (106A, 106B, 106C) to the host (100) such that the host (100) (or, more specifically, a process executing in the host (100) may obtain packets from the HRRs (106A, 106B, 106C).

In one embodiment of the invention, the software ring (108) includes a software classifier (110) and a number of software receive rings (SRR) (e.g., SRR A (112A), SRR B (112B)). In one embodiment of the invention, the software classifier (110) has the same functionality as the hardware classifier (104). However, instead of sending the classified packets to a HRR (106A, 106B, 106C), the software classifier (110) forwards classified packets to one of the SRRs (112A, 112B). The SRRs (112A, 112B) are configured to temporarily store the received packets after being classified by the software classifier (110). In one embodiment of the invention, the software ring (108) resides in a Media Access Control (MAC) layer of the host (100).

In one embodiment of the invention, each of the virtual network interface cards (VNICs) (114A, 114B, 114C, 114D) is associated with either a SRR (112A, 112B) or a HRR (106A, 106B, 106C). The VNICs (114A, 114B, 114C, 114D) provide an abstraction layer between the NIC (102) and the various packet destinations (118) executing on the host (100). More specifically, each VNIC (114A, 114B, 114C, 114D) operates like a NIC (100). For example, in one embodiment of the invention, each VNIC (114A, 114B, 114C, 114D) is associated with one or more Internet Protocol (IP) addresses, one or more Media Access Control (MAC) address, optionally, one or more ports, and, is optionally configured to handle one or more protocol types. Thus, while the host (100) may be operatively connected to a single NIC (102), packet destinations (118) (e.g., containers and/or services) executing on the host (100) operate as if the host (100) is bound to multiple NICs. In one embodiment of the invention, the VNICs (114A, 114B, 114C, 114D) resides in a Media Access Control (MAC) layer of the host (100).

Each of the VNICs (114A, 114B, 114C, 114D) is operatively connected to a corresponding virtual network stack (VNS) (116A, 116B, 116C, 116D). In one embodiment of the invention, each VNS (116A, 116B, 116C, 116D) includes functionality to process packets in accordance with various protocols used to send and receive packets (e.g., Transmission Communication Protocol (TCP), Internet Protocol (IP), User Datagram Protocol (UDP), etc.). Further, each VNS (116A, 116B, 116C, 116D) may also include functionality, as needed, to perform additional processing on the incoming and outgoing packets. This additional processing may include, but is not limited to, cryptographic processing, firewall routing, etc.

In one embodiment of the invention, each VNS (116A, 116B, 116C, 116D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). The structure and functionality of the VNSs (116A, 116B, 116C, 116D) is discussed in FIG. 4.

As discussed above, the host (100) includes one or more packet destinations (118). In one embodiment of the invention, the packet destination(s) (118)

correspond to any process (or group of processes) executing on the host that is configured to send and/or receive network traffic. Further, the packet destination(s) (118) does not include an internal network stack (i.e., there is no network stack within the packet destination(s)).

Examples of packet destinations (118) include, but are not limited to containers, services (e.g., web server), etc. As shown in FIG. 1, each of the VNSs (116A, 116B, 116C, 116D) is associated with a packet destination (118). In one embodiment of the invention, each packet destination (118) is associated with a single VNS (116A, 116B, 116C, 116D). Alternatively, each packet destination is associated with one or more VNSs (116A, 116B, 116C, 116D).

In one embodiment of the invention, each VNS (116A, 116B, 116C, 116D) is associated with a bandwidth allocation. Those skilled in the art will appreciate that if there is only one VNS (116A, 116B, 116C, 116D) bound to the packet destination (118), then the bandwidth allocation of the VNS (116A, 116B, 116C, 116D) corresponds to the bandwidth allocated to the packet destination (118). In one embodiment of the invention, the bandwidth allocation corresponds to the number of packets the packet destination (118) may receive in a given time interval (e.g., megabytes per seconds). The bandwidth allocation for a given packet destination (118) is enforced by the VNS (116A, 116B, 116C, 116D) operating in polling mode (discussed in FIG. 6).

In one embodiment of the invention, the VNIC (114A, 114B, 114C, 114D) may be bound to a virtual machine (not shown) (e.g., Xen Domain) instead of a VNS (116A, 116B, 116C, 116D). In such cases, the VNIC (114A, 114B, 114C, 114D) is bound to an interface (e.g., a Xen interface), where the interface enables the VNIC (114A, 114B, 114C, 114D) to communicate to with the virtual machine. In one embodiment of the invention, the aforementioned virtual machine includes its own network stack and includes its own operating system (OS) instance, which may be different than the OS executing on the host.

Figure 2:
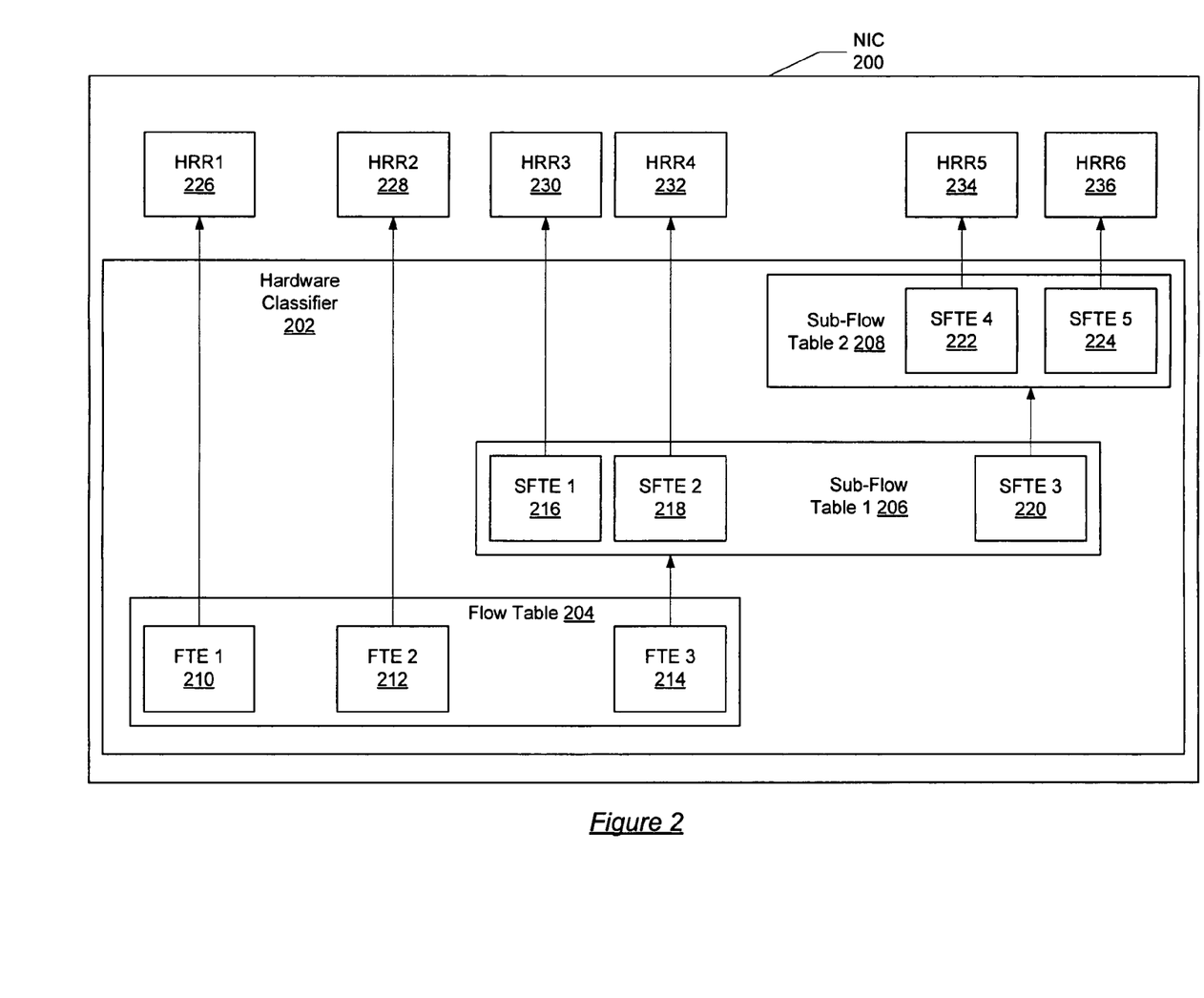
FIG. 2 shows a network interface card in accordance with one embodiment of the invention.

FIG. 2 shows a network interface card in accordance with one embodiment of the invention. The NIC (200) includes a hardware classifier (202) and a number of hardware receive rings (HRRs) (226, 228, 230, 232, 234, 236). As shown in FIG. 2, the hardware classifier (202) includes a flow table (204) and two sub-flow tables (206, 208). The flow table (204) includes a number of flow table entries (FTEs) (210, 212, 214) (discussed below in FIG. 3). Further, each of the FTEs is associated with a HRR or a sub-flow table. For example, FTE 1 (210) is associated with HRR 1 (226) and FTE 3 (214) is associated with sub-flow table 1 (206). Thus, if a packet matches FTE 1 (210) (discussed below in FIGS. 3 and 7), then the packet will be sent to HRR 1 (226). Similarly, if a packet matches FTE 3 (214), then the packet will be sent to sub-flow table 1 (206) for further processing.

Sub-flow table 1 (206) includes a number of sub-flow table entries (SFTEs) (216, 218, 220) (discussed below in FIG. 3). Each of the SFTEs is associated with either a HRR or a sub-flow table. For example, SFTE 1 (216) is associated with HRR 3 (230) and SFTE 3 (220) is associated with sub-flow table 2 (208). Thus, if a packet matches SFTE 1 (216) (discussed below in FIGS. 3 and 7), then the packet will be sent to HRR 3 (230). Similarly, if a packet matches SFTE 3 (220), then the packet will be sent to sub-flow table 2 (208) for further processing.

Sub-flow table 2 (208) includes a number of sub-flow table entries (SFTEs) (222, 224). Each of the SFTEs in sub-flow table 2 (208) is associated with a HRR. For example, SFTE 2 (222) is associated with HRR 5 (234) and SFTE 5 (224) is associated with SFTE 5 (236). Thus, if a packet matches SFTE 4 (222) (discussed below in FIGS. 3 and 7), then the packet will be sent to HRR 5 (234). Similarly, if a packet matches SFTE 5 (224), then the packet will be sent to HRR 6 (236).

Those skilled in the art will appreciate that while the hardware classifier (202) shown in FIG. 2 includes three levels of classification, that the hardware classifier may include a greater or fewer number of levels. Further, there may be more than one sub-flow table at each level above the flow table. For example, a first FTE may point to a first sub-flow table and a second FTE may point to a second sub-flow table.

In one embodiment of the invention, the hardware classifier (202) shown in FIG. 2 may be implemented in software as a software classifier (e.g., 108 in FIG. 1). In such cases, the flow tables and sub-flow tables reside on the host (typically in the software classifier). Further, instead of sending packets to HRRs, the FTEs and/or SFTEs send packets to SRRs (e.g., 112A, 112B in FIG. 1).

Figure 3:
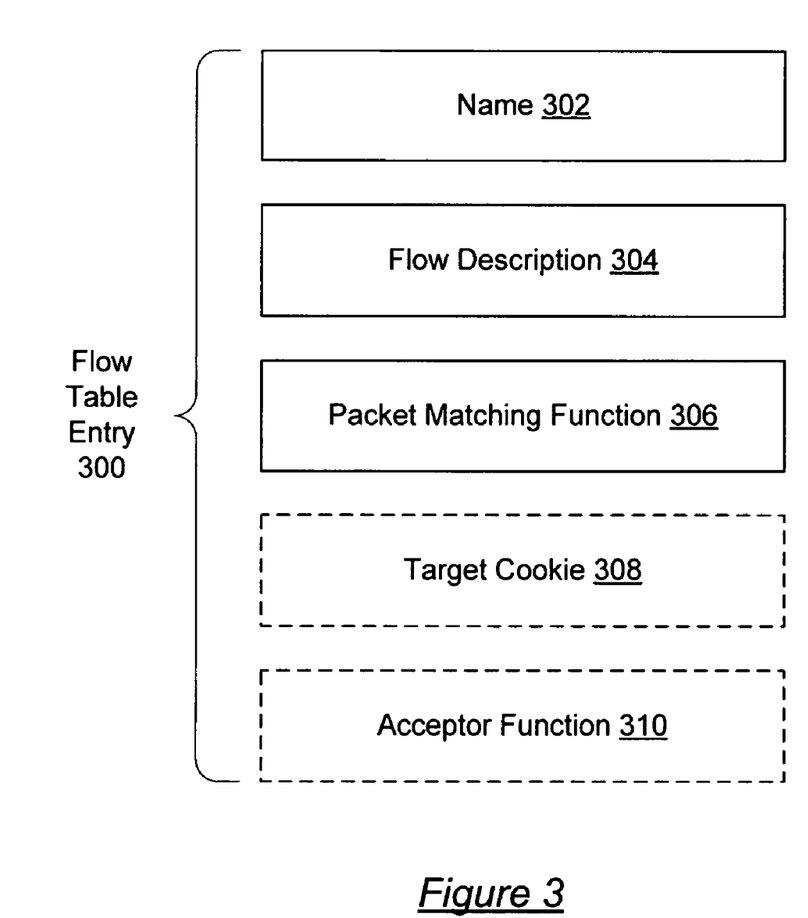
FIG. 3 shows a flow table entry in accordance with one embodiment of the invention.

FIG. 3 shows a flow table entry (FTE) in accordance with one embodiment of the invention. The FTE (300) shown in FIG. 3 may correspond to an FTE or an SFTE. As shown in FIG. 3, the FTE (300) includes a name (302), a flow description (304), a packet matching function (306), a target cookie (308), and an acceptor function (310). Each of the aforementioned components is described below.

In one embodiment of the invention, the flow corresponds to a route a packet may take once it is received by the NIC until the packet reaches its destination. In one embodiment of the invention, the name (302) corresponds to an administrator-chose name used to identify a flow with which the FTE (300) is associated.

The flow description (304) corresponds to a criterion (or criteria), where a packet must satisfy the criterion (or criteria) to be associated with the flow. The criterion (or criteria) may correspond to a level two (L2) routing criterion, a level three (L3) routing criterion, a level four (L4) routing criterion, any other criterion (or criteria) that may be used to differentiate packets, or any combination thereof. Further, there may be multiple criteria from one or more routing levels. For example, the flow description (304) may include one L2 routing criterion and two L3 routing criteria.

In one embodiment of the invention, the L2 routing criterion may include, but is not limited to, a Media Access Control (MAC) address corresponding to the source of the packet, a MAC address corresponding to the destination of the packet, and a virtual local area network (VLAN) tag.

In one embodiment of the invention, the L3 routing criterion may include, but is not limited to, an Internet Protocol (IP) address corresponding to the source of the packet, an IP address corresponding to the destination of the packet, an IPv6 Flow ID, and a protocol number (i.e., the 8-bit number in the "Protocol" field of the IPv4 header or the "Next Header" field in the IPv6 header). In one embodiment of the invention, the L4 routing criterion may include, but is not limited to, a TCP port number.

In one embodiment of the invention, the packet matching function (306) corresponds to function that takes a packet header (or appropriate portion(s) thereof) and the flow description (304) as input and determines whether the corresponding packet (i.e., the packet associated with the aforementioned packet header) satisfies the criterion (or criteria) listed in the flow description.

For example, if the flow description required a destination IP address of 10.1.1.5 and the packet has a destination IP address of 10.1.2.3, then the packet matching function would return a result indicating that the packet did not match the criterion in the flow description.

In one embodiment of the invention, the target cookie (308) identifies a VNIC (e.g., 114A, 114B, 114C, 114D in FIG. 1) that is associated with the flow (i.e., the flow described in the flow description (304)). Further, the target cookie (308) may include additional information necessary to forward the packet to the VNIC. The packets that match the FTE are eventually sent, using interrupt or polling mode (described below), to the VNIC identified by the target cookie (308).

In one embodiment of the invention, the acceptor function (310) corresponds to a function that, when executed, sends the packet to a VNIC (i.e., the VNIC identified by the target cookie (308)). In one embodiment of the invention, the acceptor function (310) takes a packet and the target cookie (308) as input. Further, the acceptor function (310), during execution, sends the packet to the VNIC identified by the target cookie (308).

In one embodiment of the invention, if the FTE (300) points to a sub-flow table, then the acceptor function (310) and the target cookie (308) may not be present in the FTE. Rather, the FTE may include a pointer (or some other data structure) to direct the classifier to the sub-flow table associated with the FTE (300).

Figure 4:
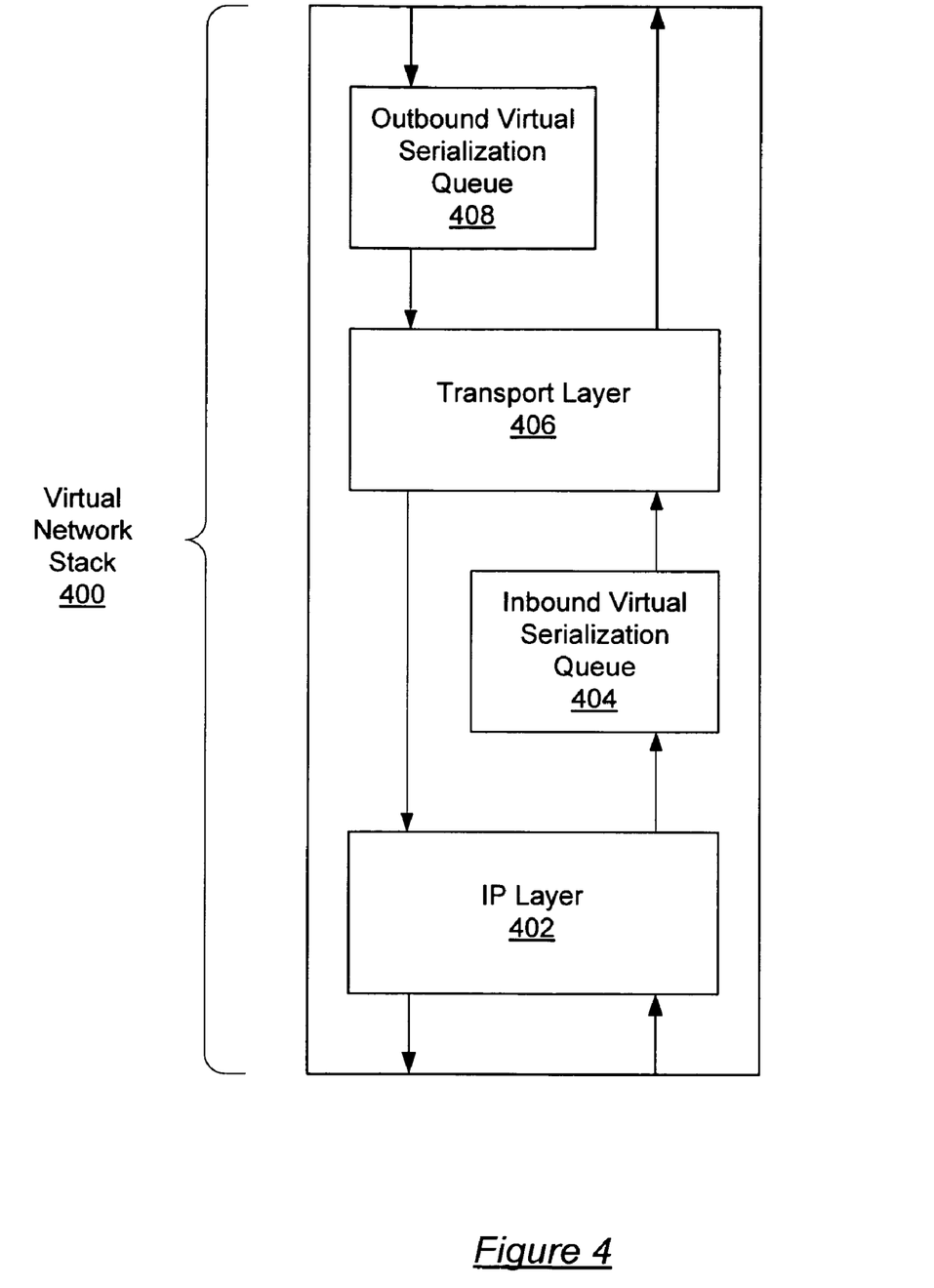
FIG. 4 shows a virtual network stack in accordance with one embodiment of the invention.

FIG. 4 shows a virtual network stack (VNS) in accordance with one embodiment of the invention. In one embodiment of the invention, the VNS (400) includes an Internet Protocol (IP) layer (402), an inbound virtual serialization queue (VSQ) (404), a transport layer (406), and an outbound virtual serialization queue (VSQ) (408). Each of the aforementioned components is discussed below.

In one embodiment, the IP layer (402) is configured to receive packets from the VNIC associated with the VNS (404) (e.g., VNS D (116A) receives packets from VNIC D (14D) in FIG. 1). Further, the IP layer (402) is configured to receive packets from the transport layer (406). In one embodiment of the invention, the IP layer (402) is configured to perform IP level processing for both inbound and outbound packets.

Continuing with the discussion of FIG. 4, the inbound VSQ (404) is configured to receive packets from the IP layer (402). The inbound VSQ (404) corresponds to a queue data structure and is configured to queue packets received from the IP layer (402) before the packets are processed by the transport layer (406). In one embodiment of the invention, the inbound VSQ (404) may be used to control the rate of packets being received by the packet destination (e.g., 118 in FIG. 1) associated with VNS (400). The inbound VSQ (404) may control the bandwidth by limiting the number of packets in the inbound VSQ (404) and preventing additional packets from entering the VNS (400) until the inbound VSQ (404) has less than a threshold number of packets.

In one embodiment of the invention, the transport layer (406) is configured to process inbound and outbound packets in accordance with Transmission Control Protocol (TCP), User Datagram Protocol (UDP), or both UDP and TCP.

In one embodiment of the invention, the outbound VSQ (408) is a queue data structure configured to receive packets from the packet destination (e.g., 118) with which the VNS (404) is associated. Further, the outbound VSQ (408) is configured to store packets prior to sending the received packets to the transport layer (406). In one embodiment of the invention, the outbound VSQ (408) is also configured to control the flow of packets from the packet destination (e.g., 118) associated with the VNS (400). In one embodiment of the invention, the outbound VSQ (408) (or a related process) is configured to block an application from sending packets to the outbound VSQ (408) if the packet destination (e.g., 118) is attempting to issue packets at a higher rate than the outbound bandwidth allocated to the packet destination (e.g., 118). Further, the outbound VSQ (408) (or a related process) is configured to notify the packet destination (e.g., 118) when it is no longer blocked from issuing packets to the VNS (400).

In one embodiment of the invention, the inbound VSQ (404) and outbound VSQ (408) are each configured to enforce the manner in which packets are processed. Specifically, the inbound VSQ (404) and outbound VSQ (408) may be configured to enforce the packet processing requirements imposed by the transport layer (406). For example, TCP requires serial processing of packets. Thus, the inbound VSQ (404) and outbound VSQ (408) may require all threads accessing the inbound VSQ (404) and outbound VSQ (408) to conform to a mutual exclusion policy. In one embodiment of the invention, the mutual exclusion policy requires that only one thread may access the VSQ at a time. Thus, if two threads are attempting to access a given VSQ, one thread must wait until the other thread has finished accessing the VSQ.

Alternatively, if the transport layer (406) only supports UDP, then the inbound VSQ (404) and outbound VSQ (408) may be configured to allow concurrent access. Said another way, two or more threads may concurrently access the VSQ. In one embodiment of the invention, if the transport layer (406) is configured to process both TCP and UDP packets, then the inbound VSQ (404) and outbound VSQ (408) are configured to conform to the more stringent standard (e.g., TCP if the transport layer supports both TCP and UDP).

In one embodiment of the invention, the inbound VSQ (404) and the outbound VSQ (408) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis).

Figure 5:
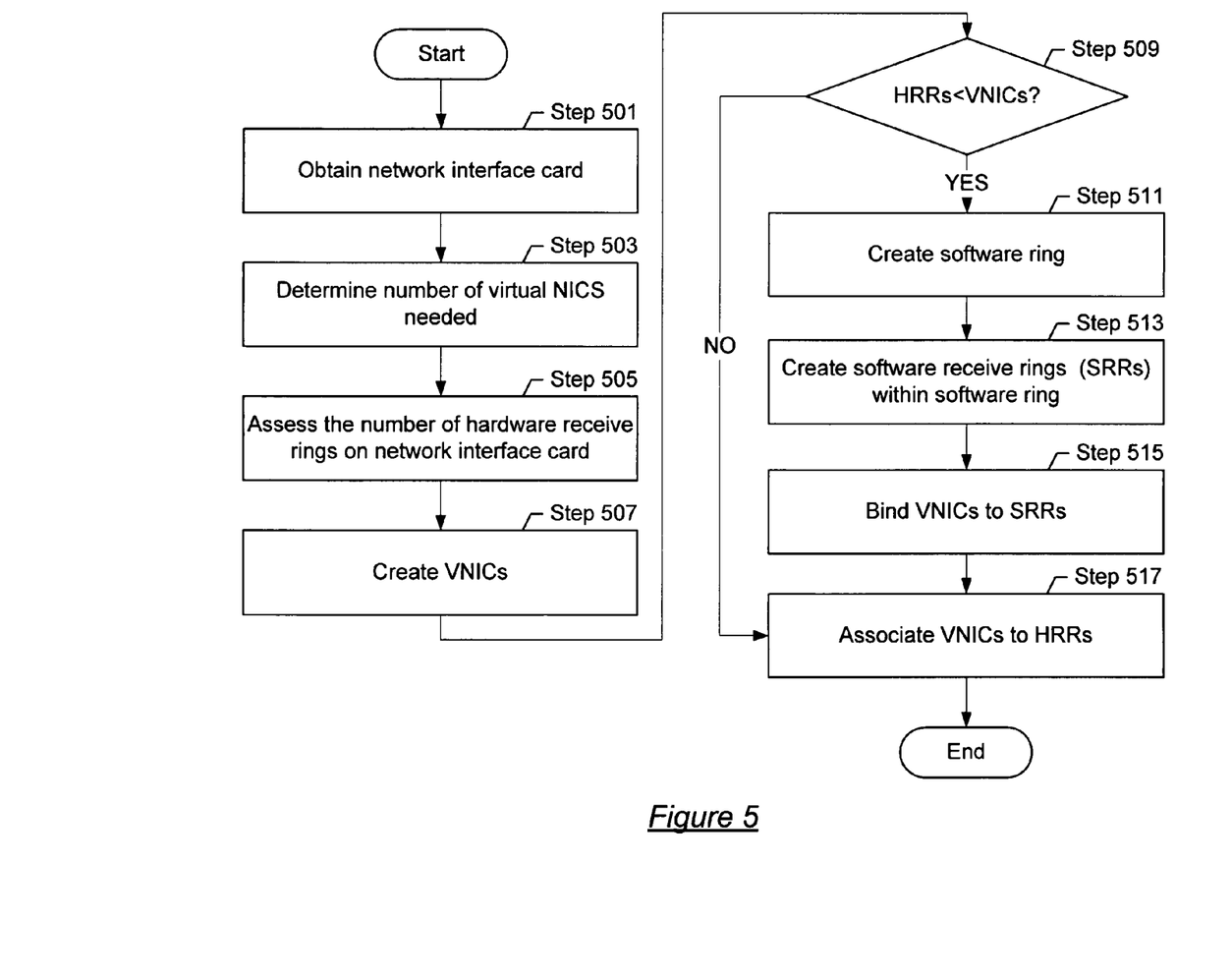
FIGS. 5-7 show flow charts in accordance with one or more embodiments of the invention.

FIG. 5 shows a flow chart in accordance with one or more embodiments of the invention. First, a network interface card (NIC) is obtained (Step 501). In one embodiment of the invention, obtaining the NIC includes determining, by the host, that a NIC is connected to the host and that it is ready to be used. Once the NIC is obtained, a determination is made regarding the number of VNICs that need to be created on the host (Step 503). In one or more embodiments of the invention, the number of VNICs required corresponds to the number of packet destinations on the host.

Once the number of VNICs to be created has been determined, the number of hardware receive rings (HRRs) on the NIC is assessed (Step 305). VNICs are subsequently created in the host, where the number of VNICs created corresponds to the number of VNICs determined in Step 503 (Step 507).

Next, a determination is made about whether there are fewer HRRs than VNICs on the host (Step 509). If there are fewer HRRs than VNICs on the host, then a software ring is created in the host and subsequently associated with one of the HRRs (Step 511).

A set of software receive rings (SRRs) is then created within the software ring (Step 513). The VNICs are then bound to the SRRs (Step 315). More specifically, the VNICs that cannot not be bound to the HRRs are bound to the SRRs. The remaining VNICs are bound to the HRRs (Step 317). Those skilled in the art will appreciate that steps in FIG. 5 may be executed in a different order.

In one embodiment of the invention, VNICs are preferably bound to an HRR if an HRR is available and the hardware classifier in the NIC is configured to perform the level of classification required by the host. In such cases, one HRR is bound to a software ring and the other HRRs are bound to VNICs. In one embodiment of the invention, each of the aforementioned VNICs is associated with a virtual network stack (VNS). Further, each VNS is associated with a bandwidth allocation.

As stated above, software rings can be arbitrarily created on top of HRR or software SRRs. As a result, different structures involving software rings can be created to handle the same number of VNICs using the method shown in FIG. 5.

Figure 6:
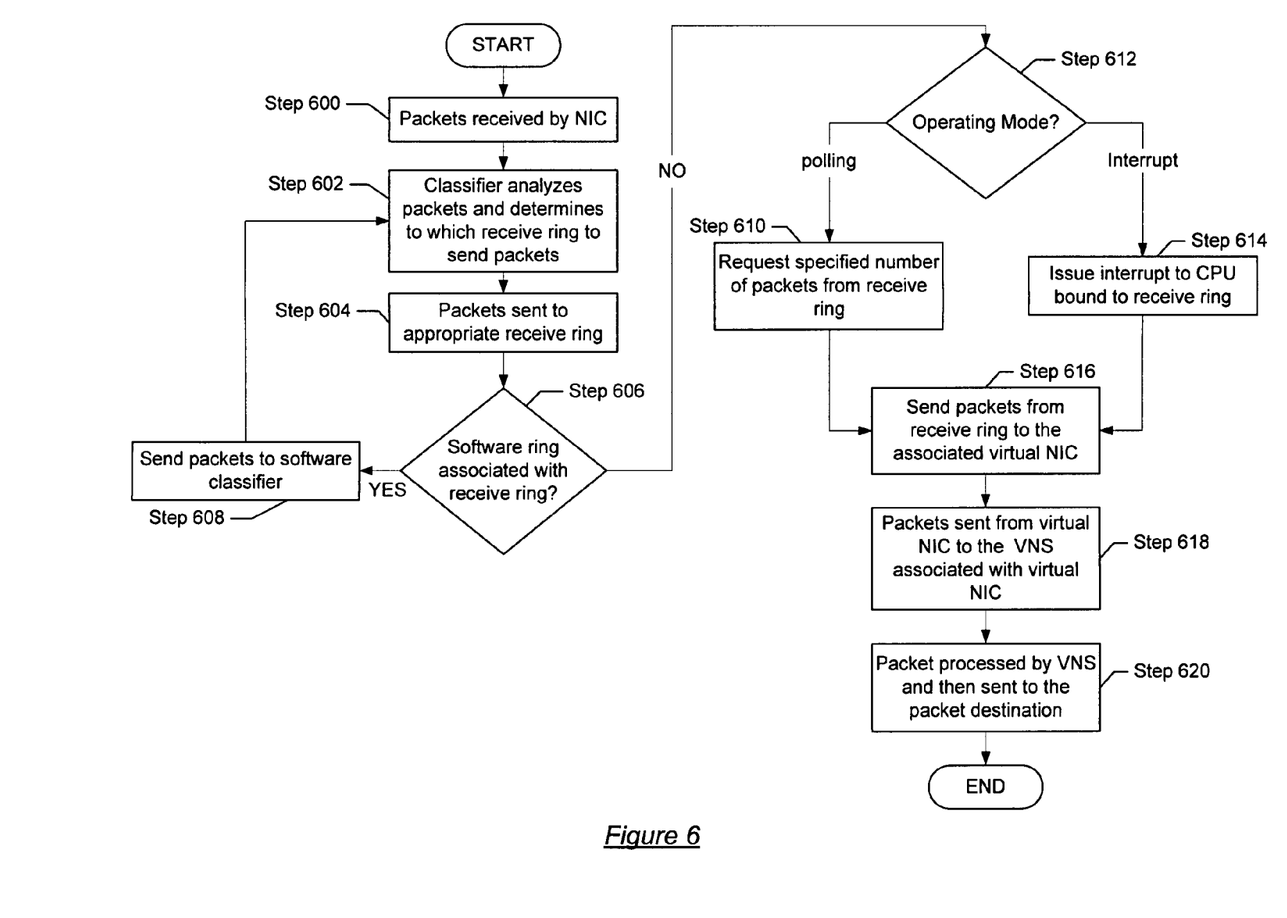

FIG. 6 shows a flow chart in accordance with one or more embodiments of the invention. Initially, packets are received by a NIC (Step 600). Next, a hardware classifier associated with the NIC determines to which receive ring (e.g., HRR) on the NIC to send the packets (Step 602). The packets are then sent to the appropriate receive ring (Step 604) based on the classifier's assessment. In one embodiment of the invention, the classifier uses multi-level classification as shown in FIGS. 2-3 and described in FIG. 7 below to classify the packets.

Continuing with the discussion in FIG. 6, a determination is then made about whether the receive ring is associated with a software receive ring (Step 606). If the receive ring is associated with a software receive ring, then the packets are forwarded to a software classifier (Step 608). If Step 602 is entered from Step 608, then classifier in Step 602 now corresponds to a software classifier and all references to receive rings in Steps 602-620 correspond to SRRs. Said another way, when Steps 602-606 are initially performed, the classifier corresponds to a hardware classifier and the receive rings correspond to HRRs. However, if the HRR is bound to a software ring (see Step 606), then in all subsequent executions of Steps 602-620, the classifier corresponds to a software classifier and all references to receive rings in Steps 602-620 correspond to SRRs.

If the receive ring is not associated with a software receive ring, then at this stage, the processing of the packets differs depending on mode in which the virtual serialization queue (VSQ) (which is bound to the HRR or connected to the SRR) is operating (Step 612). The aforementioned VSQ is associated with a VNS bound to a VNIC, where the VNIC is associated with the receive ring (HRR or SRR).

Continuing with the discussion of FIG. 6, if the VSQ is operating in polling mode, then the packets remain in the receive ring (HRR or SRR) until the VSQ requests a specified number of packets from the receive ring (Step 610). In one embodiment of the invention, the VSQ does not request any packets when there are packets already queued on the VSQ. In one or more embodiments of the invention, the VSQ retrieves all packets from the receive ring when a request is made for packets.

Those skilled in the art will appreciate that the receive rings store a finite number of packets. Thus, if the receive rings receive packets at a faster rate than the rate at which the corresponding VSQ requests the packets, the receive rings will eventually fill completely with packets and packets received after this point are dropped until packets on the receive rings are requested and processed. In one embodiment of the invention, the rate at which packets are requested from the receive ring (SRR or HRR) and the number of packets requested is determined by the bandwidth allocation of the VNS bound to the receive ring.

Alternatively, if the VSQ is operating in interrupt mode, then an interrupt is issued to a processor (i.e., a processor bound to the VSQ that is bound to the VNS associated with the receive ring) (Step 614). In one embodiment of the invention, if the receive ring is an SRR and it is bound to a VNIC, then the interrupt (as recited in Step 614) is a software interrupt as opposed to a hardware interrupt (as recited in Step 614), which is generated when the HRR is bound to a VNIC. The packets are then sent to the VNIC (Step 616).

In one embodiment of the invention, if the VSQ is operating polling mode, then the VSQ, which includes a copy of the appropriate acceptor function, uses the acceptor function to obtain the packet from the receive ring and place it in the appropriate VNIC. Alternatively, if the VSQ is operating in polling mode, then the device driver (or NIC) executes the acceptor function to send the packet from the receive ring to the appropriate VNIC.

The VNIC subsequently forwards the packets to the appropriate VNS (Step 618), where the packets are processed and then sent to the packet destination (Step 620).

Figure 7:
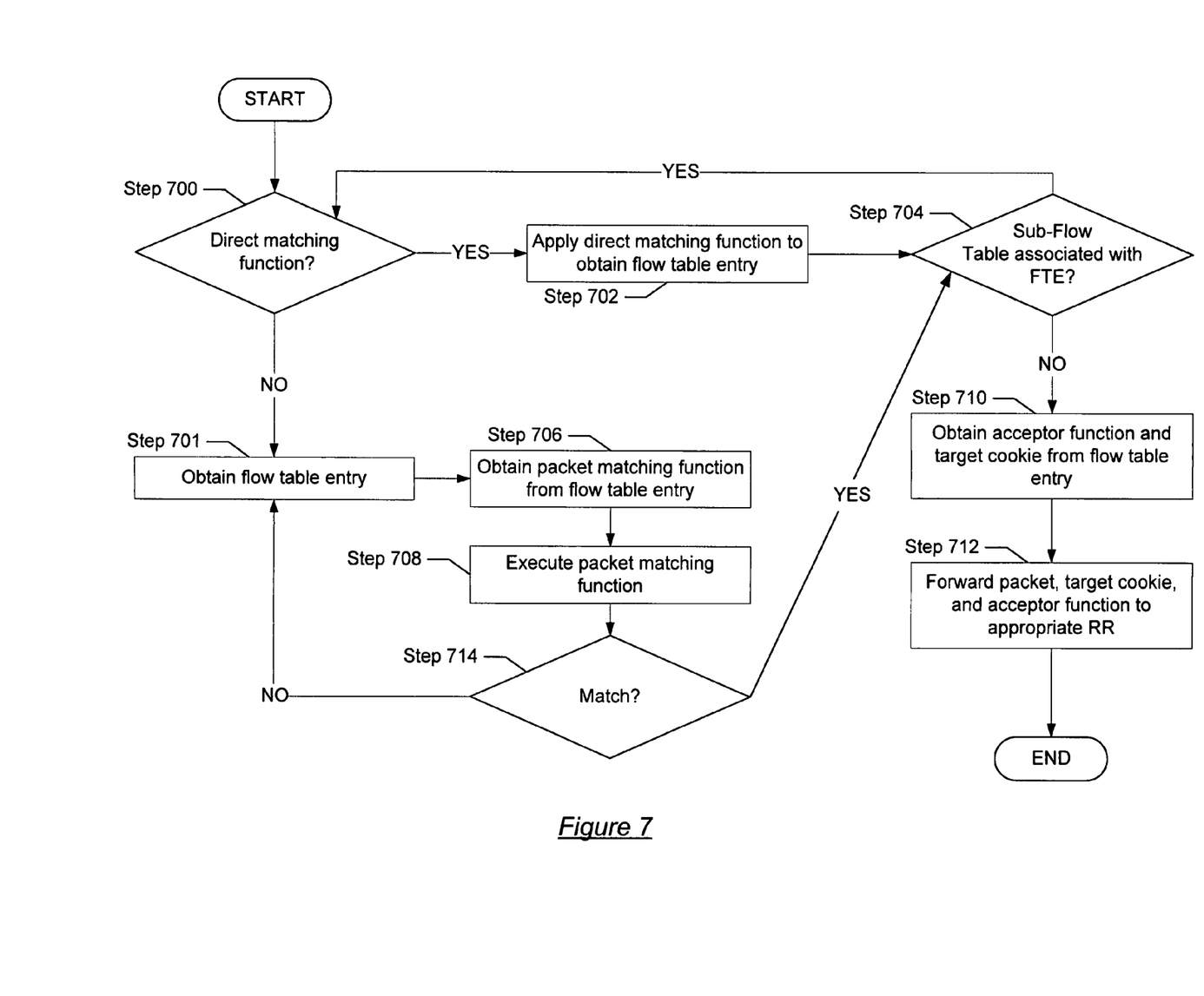

FIG. 7 shows a flow chart in accordance with one or more embodiments of the invention. More specifically, FIG. 7 shows a method for classifying a packet in accordance with one embodiment of the invention. The method shown in FIG. 7 may be implemented by a hardware classifier, a software classifier or both.

Once a packet is received, a determination is made about whether the classifier is using a direct matching function for the current level of classification (Step 700). In one embodiment of the invention, the direct matching function corresponds to a function such as a hashing function, where at most one flow table entry (FTE) (or sub-flow table entry SFTE) matches the result of the direct matching function. The direct matching function uses the packet header (or a portion thereof) as input to obtain the result of the direct matching function.

In one embodiment of the invention, the current level of classification corresponds to the flow table (or sub-flow table) the classifier is currently using to classify the packet. For example, returning to FIG. 2, classifier (202) initially uses flow table (204). Thus, the classifier (202) may use a direct matching function to locate an appropriate FTE (e.g., FTE 3 (214)). However, when the classifier (204) is searching sub-flow table 1 (206), the classifier (204) does not use a direct matching function.

Continuing with the discussion of FIG. 7, if the classifier is using a direct matching function for the current level of classification, then the direct matching function is applied to the packet header (or portion thereof) to obtain a FTE (Step 702). A determination is then made about whether the FTE is associated with a sub-flow table (Step 704). If the FTE is associated with a sub-flow table, then the process proceeds to Step 700. Alternatively, the process proceeds to Step 710.

At Step 710, the acceptor function and target cookie are obtained from the FTE). The packet, target cookie, and acceptor function at then forwarded to the appropriate RR (HRR or SRR) (Step 712). At this stage, the packet is forwarded to the VNIC specified in the target cookie using either interrupt mode or polling mode as discussed above.

Returning to Step 700, if the classifier is not using a direct matching function for the current level of classification, then a FTE is obtained (Step 701), where the FTE is located in the flow table the classifier is currently using to classify the packets. For example, returning to FIG. 2, if the classifier is currently using flow table (204), then the FTE is selected from flow table (204).

Continuing with the discussion of FIG. 7, once the FTE is obtained, the packet matching function is obtained from the FTE (Step 706). The packet matching function is then executed (Step 708). As discussed above, the packet matching function takes the packet header (or portion thereof) and a flow description (obtained from the FTE) as input and generates a result that indicates whether or not the packet is associated with the flow (i.e., matches the flow description). If the packet matches the flow description (Step 714), then process proceeds to Step 704. If the packet does not match the flow description (Step 714), then the process proceeds to Step 702.

In one embodiment of the invention, if the process enters Step 700 from Step 704, then all subsequent references to FTE corresponds to sub-flow table entry (SFTE).

Figure 8:
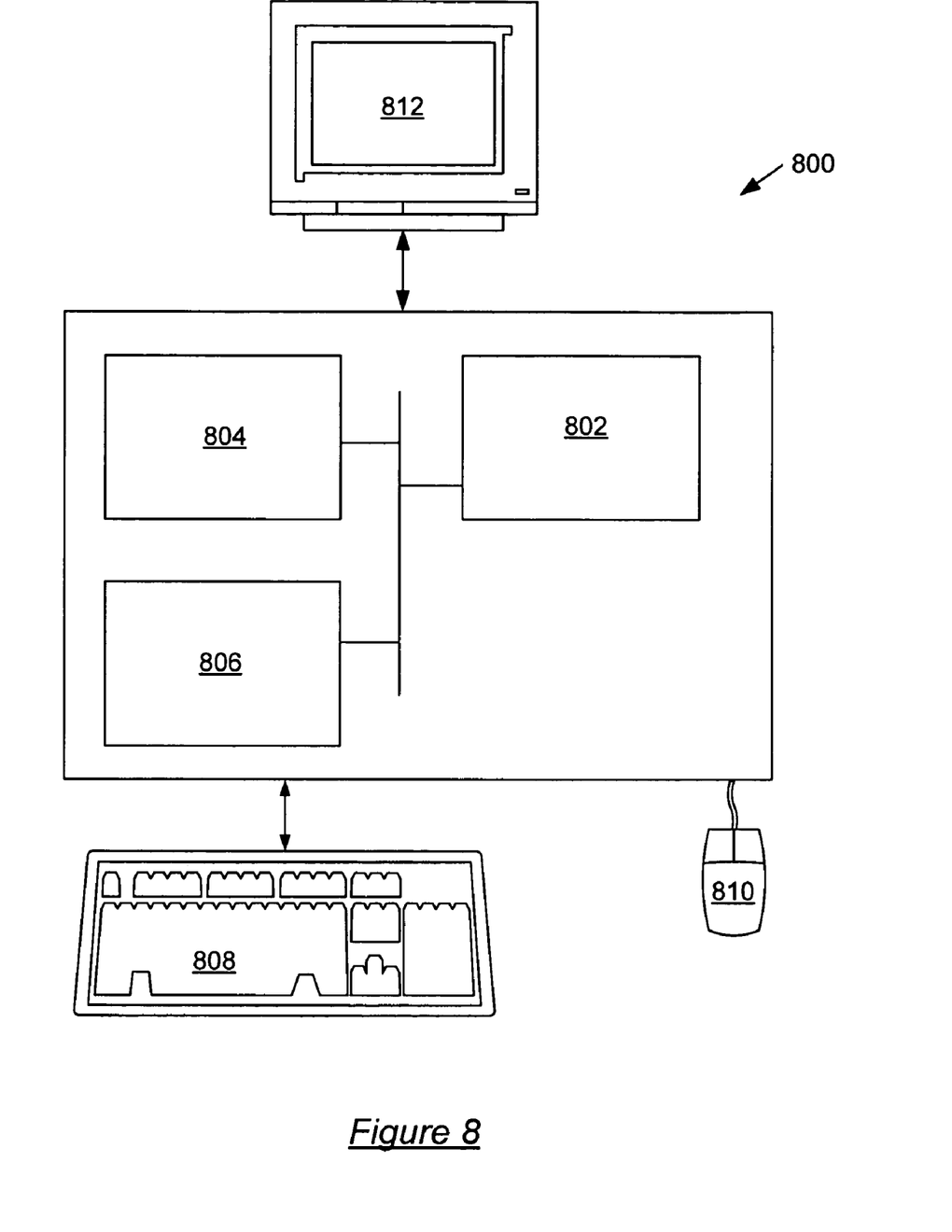
FIG. 8 shows a computer in accordance with one embodiment of the invention.

An embodiment of the invention may be implemented on virtually any type of computer regardless of the platform being used. For example, as shown in FIG. 8, a networked computer system (800) includes a processor (802), associated memory (804), a storage device (806), and numerous other elements and functionalities typical of today's computers (not shown). The networked computer (800) may also include input means, such as a keyboard (808) and a mouse (810), and output means, such as a monitor (812). The networked computer system (800) is connected to a local area network (LAN) or a wide area network via a network interface connection (not shown). Those skilled in the art will appreciate that these input and output means may take other forms. Further, those skilled in the art will appreciate that one or more elements of the aforementioned computer (800) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network interface card (NIC), comprising: a plurality of receive rings (RRs); a flow table comprising a plurality of flow table entries (FTEs); a first sub-flow table comprising a first plurality of sub-flow table entries (SFTEs); wherein the NIC is configured to:
  receive the packet wherein the packet comprises a header; and traverse the flow table;
  for each FTE encountered during the traversal:
  obtain a packet matching function associated with the FTE;
  apply the packet matching function associated with the FTE to the header to determine whether the packet matches the FTE;
  if the packet matches the FTE:
  send the packet to one selected from a group consisting of one of the plurality of receive rings (RRs) associated with the FTE and the first sub-flow table, wherein the first sub-flow table is associated with the FTE; and stop the traversal of the flow table; and if the packet does not match the FTE:

continue the traversal of the flow table.

2. The network interface card of claim 1, wherein if the packet matches the FTE and is sent to the first sub-flow table: traversing the first sub-flow table; for each SFTE encountered during the traversal:

obtaining a packet matching function associated with the SFTE;

applying the packet matching function associated with the SFTE to the header to determine whether the packet matches the SFTE;

if the packet matches the SFTE:

sending the packet to one selected from the group consisting of one of the plurality of RRs associated with the SFTE and a second sub-flow table, wherein the second sub-flow table is associated with the SFTE;

stopping the traversal of the first sub-flow table; and if the packet does not match the SFTE:

continuing the traversal of the first sub-flow table.

3. The network interface card of claim 1, wherein if the packet matches the FTE and is sent to one of the plurality of RRs the network interface card is further configured to:

obtain an acceptor function and a target cookie from the FTE, wherein the target cookie specifies a virtual network interface card (VNIC) associated with the one of the plurality of RRs;

send the packet, the acceptor function, and the target cookie to the one of the plurality of RRs;

issue an interrupt, after receiving the packet; and execute, after issuing the interrupt, the acceptor function using the target cookie and packet as arguments, wherein execution of the acceptor function sends the packet to the VNIC, wherein the VNIC is located on a host operatively connected to the network interface card.

4. The network interface card of claim 1, wherein if the packet matches the FTE and is sent to one of the plurality of RRs, the network interface card is further configured to:

send the packet to the one of the plurality of RRs;

execute an acceptor function, wherein execution of the acceptor function sends the packet to the VNIC and wherein the acceptor function is obtained from a virtual serialization queue associated the VNIC, wherein the VNIC is located on a host operatively connected to the network interface card.

5. The network interface card of claim 1, wherein each FTE comprises a flow description defining a criterion, wherein the criterion is used by the packet matching function associated with the FTE to determine whether the packet is associated with the FTE.

6. The network interface card of claim 5, wherein the criterion is at least one selected from a group consisting of a level two (L2) routing criterion, a level three (L3) routing criterion, and a level four (L4) routing criterion.

* * * * *